United States Patent

[11] 3,564,162

[72] Inventor Benjamin B. Bauer
Stamford, Conn.
[21] Appl. No. 702,723
[22] Filed Feb. 2, 1968
[45] Patented Feb. 16, 1971
[73] Assignee Columbia Broadcasting System, Inc.
New York, N.Y.

[54] STEREOPHONIC RECORDING SYSTEMS WITH QUADRATURE PHASE RELATION
14 Claims, 2 Drawing Figs.

[52] U.S. Cl. .......... 179/100.4, 179/1
[51] Int. Cl. .......... G11b 3/00, H03f 13/00
[50] Field of Search .......... 179/100.1; 100.2MI; 100.1(TC), 100.3(T) 100.4(ST), 100.4(C) 100.41(ST), 600.4(A), 1(A), 1.3

[56] References Cited

UNITED STATES PATENTS 3,059,065 10/1962 Tourtellot .......... 179/100.4
3,013,125 12/1961 Goldmark .......... 179/100.4
3,076,873 2/1963 Owen .......... 179/100.4
3,083,264 3/1963 Wintringham .......... 179/100.4

OTHER REFERENCES

H. M. Tremaine " Audio Cyclopedic" Howard Sams & Co., Inc., New York 1959 P174— 176

*Primary Examiner*—Bernard Konick
*Assistant Examiner*—Raymond F. Cardillo, Jr.
*Attorney*—Brumbugh, Graves, Donohue & Raymond

ABSTRACT: Stereophonic disc records are made by recording as vertical record groove modulation a stereophonic difference signal from which low frequency components have been extracted, and as lateral groove modulation a stereophonic sum signal to which the low frequency components extracted from the difference signal have been added, the latter components being maintained in substantially quadrature relation to the corresponding frequency components of the sum signal so as to avoid cancellation.

PATENTED FEB 16 1971 3,564,162

INVENTOR
BENJAMIN B. BAUER
BY
Brumbaugh, Free, Graves & Donohue
ATTORNEYS

STEREOPHONIC RECORDING SYSTEMS WITH QUADRATURE PHASE RELATION

BACKGROUND OF THE INVENTION

1. Field of the Invention

This invention relates to stereophonic recording systems and, more particularly, to a stereophonic recording system which is adapted to enhance the quality of reproduction of a stereophonic recording on nonstereophonic and stereophonic phonograph reproducers.

2. Description of the Prior Art

In systems for recording stereophonic information comprising two stereophonic channels in a single-groove record disc, it is customary to modulate the disc groove in two perpendicular directions simultaneously, usually at 45° to the record surface. This results in a lateral groove modulation representing the sum of the two stereophonic signals and a vertical groove modulation representing the difference between the two signals. When a stereophonic reproducing stylus moves through the groove of a disc prepared in this manner, the stylus responds to the lateral groove modulation in the customary way to generate a signal representing the sum of the two signals and, at the same time, is resiliently deflected in the vertical direction in a similar manner by the vertical groove modulation to produce the difference signal.

Normally, it is difficult to make records with large vertical signals such as those representing low frequencies, for example. Moreover, when a nonstereophonic reproducing stylus moves through a vertically modulated disc groove, the stylus may not respond to the modulation resiliently but rather may tend to remain in a relatively fixed vertical position. Accordingly, when this modulation is excessive, as it may be in the case of signals representing low frequencies, improper tracking of the stylus will result and distorted signals will be generated.

In order to reduce the amount of vertical modulation in the groove of a record disc for reproduction by stereophonic and nonstereophonic phonographs, systems have been devised which limit the amplitude of the difference signal to a fraction of its original amplitude. While this has the effect of decreasing the distortion in reproduction, it also diminishes the quality of the reproduced sound in those frequency portions which would not have caused excessive vertical modulation.

SUMMARY

Accordingly, it is an object of the invention to provide a new and improved recording system which produces improved stereophonic record discs.

Another object of the invention is to provide a new and improved recording system which produces stereophonic record discs that can be played on a nonstereophonic phonograph without causing distortion.

It is another object of the invention to provide a new and improved recording system which facilitates the production of record discs that may be played on a stereophonic phonograph without altering the total sound energy in the stereophonic channels.

It is still another object of the invention to provide a recording system of the above character for producing stereophonic record discs wherein the vertical modulation of the record groove does not interfere with the response of a nonstereophonic reproducer and, at the same time, retains excellent stereophonic properties.

These and other objects of the invention are accomplished by deriving two audio information signals, one defining the lateral modulation of the record groove and the other defining the vertical groove modulation, and adding to the lateral modulation signal a modified portion of the vertical groove modulation signal representing low frequency components. The portion of the vertical information signal is preferably phase-shifted by a predetermined amount relatively to the corresponding frequency components of the signal in the lateral information channel so as to avoid signal cancellation. Thereafter, the information signal defining the lateral modulation and the information signal defining the vertical modulation are supplied to a transducer for driving a cutting stylus in both the vertical and lateral directions.

In a preferred embodiment of the invention, a phase difference of, say, 90° is maintained between frequency components of the information signal in the vertical channel and corresponding frequency components of the information signal in the lateral channel, and the vertical signal is separated into low and high frequency components. The low frequency components are then shifted to the lateral mode of modulation by adding them to the information signal in the lateral channel.

In another embodiment of the invention, the information signal in the vertical channel is divided into several frequency bands, each transmitting a selected portion of the frequency spectrum. The lowest frequency band component of the vertical information signal is maintained substantially in quadrature with the corresponding frequency band components of the information signal in the lateral channel and is combined with the lateral information signal. The middle frequency component of the vertical information signal is divided into portions of different amplitudes, one amplitude portion being time delayed for a selected period of time before addition to the lateral information signal and the other amplitude position being added to the high frequency component of the vertical information signal without delay.

BRIEF DESCRIPTION OF THE DRAWING

Further objects and advantages of the invention will be apparent from a reading of the following detailed description taken in conjunction with the accompanying drawings, in which:

In FIG. 1, an input circuit 10 receives two stereophonic signals from two pairs of terminals 12 and 11, respectively. Within the input circuit 10, the signal information is applied to two identical matrixing transformers 13 and 14 through primary windings 15 and 16 connected to the pairs of terminals 11 and 12, respectively. In order to generate an audio information signal representing the sum of the two stereophonic signals, one secondary winding 17 of the transformer 13 is connected in series and inphase with a like output winding 18 of the transformer 14, this signal being connected through the leads 19 to a conventional phase shifter 20.

Figure 1:
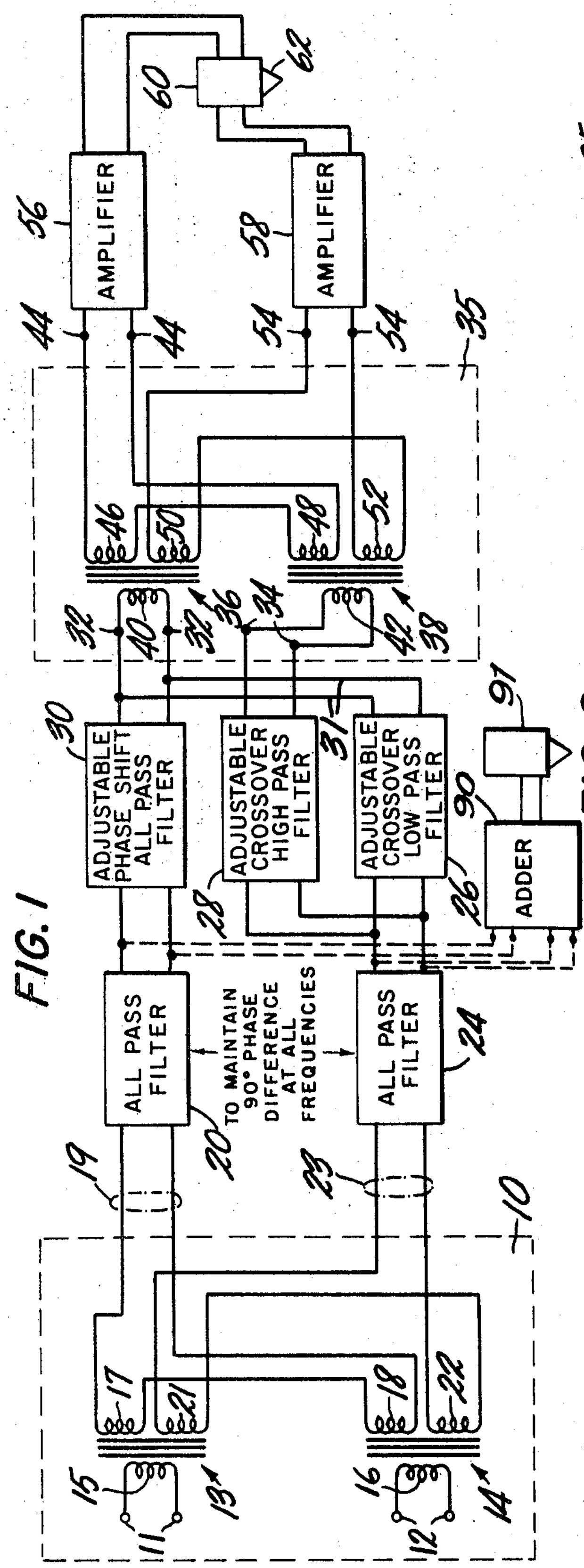
FIG. 1 is a schematic block diagram illustrating one embodiment of the present invention.

In similar fashion, the secondary winding 21 of the transformer 13 is linked in series and in out-of-phase relation with a similar secondary winding 22 of the transformer 14, so as to generate a combined signal representing the difference between the two stereophonic signals. This signal is supplied through the conductors 23 to a second phase shifter 24. The phase shifters 20 and 24 are designed in accordance with good engineering practice so as to introduce a 90° phase shift differential between the sum and differences representing signals at all frequencies without altering their magnitudes. So-called "all pass" networks are suitable for this purpose the network 24 having a phase shift at all frequencies 90° greater than the network 20.

From the phase shifter 24, the difference signal is supplied to a pair of parallel connected band-pass filters 26 and 28 which are adapted to divide the phase shifted difference signal into low and high frequency components in quadrature, respectively. Actually, the filters 26 and 28 may be the low pass and high pass sections, respectively, of a conventional constant resistance dividing network, there normally being a 90° phase difference between the outputs of the low pass and high pass sections.

The crossover frequencies of the filter 26 and 28 should be adjustable over a range so as to enable excessive low frequency vertical signal amplitudes to be avoided without impairing the audible stereophonic effect. Experience indicates that frequencies above 1,000 Hertz seldom produce excessive vertical modulation of the record groove. Accordingly, in a typical case, the filters 26 and 28 might be designed to permit adjustment of the crossover frequency in, say, five steps from about 250 Hertz to about 1,000 Hertz.

Since the low pass filter 26 shifts the phase of the low frequency components of the difference signal a conventional "all-pass" filter 30 is provided in the sum channel to produce a like phase shift on the sum signal, thus maintaining the 90° out-of-phase relation between the sum and difference signals. Since the phase shift introduced by the filter 26 will vary with the crossover frequency, the filter 30 should be adjustable over a range commensurate with the range of phase shifts corresponding to the range of crossover frequencies to which the filter 26 can be set. If desired, the functions of the filters 20 and 30 may be combined in a single filter.

The low frequency components of the vertical information signal are conducted from the output of the filter 26 through the conductors 31 to the output of the filter 30 where they are added to the sum or lateral information signal. The modified lateral information signal is then supplied to a pair of terminals 32, while the high pass portion of the vertical information signal is fed from the filter 28 to a pair of terminals 34. If the record disc is to be cut with a 45° stereophonic cutter, an output circuit 35 should be provided which includes two matrixing transformers 36 and 38 having primary windings 40 and 42 connected to the pairs of terminals 32 and 34, respectively, and each having two secondary windings 46, 50 and 48, 52, respectively. In order to generate the desired stereophonic signals, one pair of output terminals 44 is connected to receive the combined outputs of the secondary windings 46 and 48 connected in series and in-phase while two other secondary windings 50 and 52 are connected in series and in out-of-phase relation and to another pair of output terminals 54.

Suitable audio amplifiers 56 and 58 amplify the signals from the pairs of terminals 44 and 54, respectively, and transmit them to a recording transducer 60 which drives a cutting stylus 62, the transducer in this case being arranged to modulate the record groove at 45 ° in accordance with the sum of the signals at the terminals 32 and 34 and at −45° in accordance with the difference between these signals. If the transducer 60 is of the type adapted to modulate the groove vertically in response to the signal at the pair of terminals 34 and laterally according to the signal at the terminals 32, the matrixing transformer 36 and 38 in the output circuit 35 can be omitted and the pairs of terminals 32 and 34 connected directly to the pairs of terminals 44 and 54, respectively.

It will be understood that a stereophonic record disc made with the above-described apparatus will be free from excessive vertical modulation and the reproducing stylus of either a stereophonic or a nonstereophonic reproducer will ride smoothly in the groove. Moreover, since tests have shown that the low frequencies contribute little to the stereophonic effect, transfer of the low frequency components from the vertical channel to the sum channel does not significantly diminish the stereophonic effect achieved on playback of the record.

Figure 2:
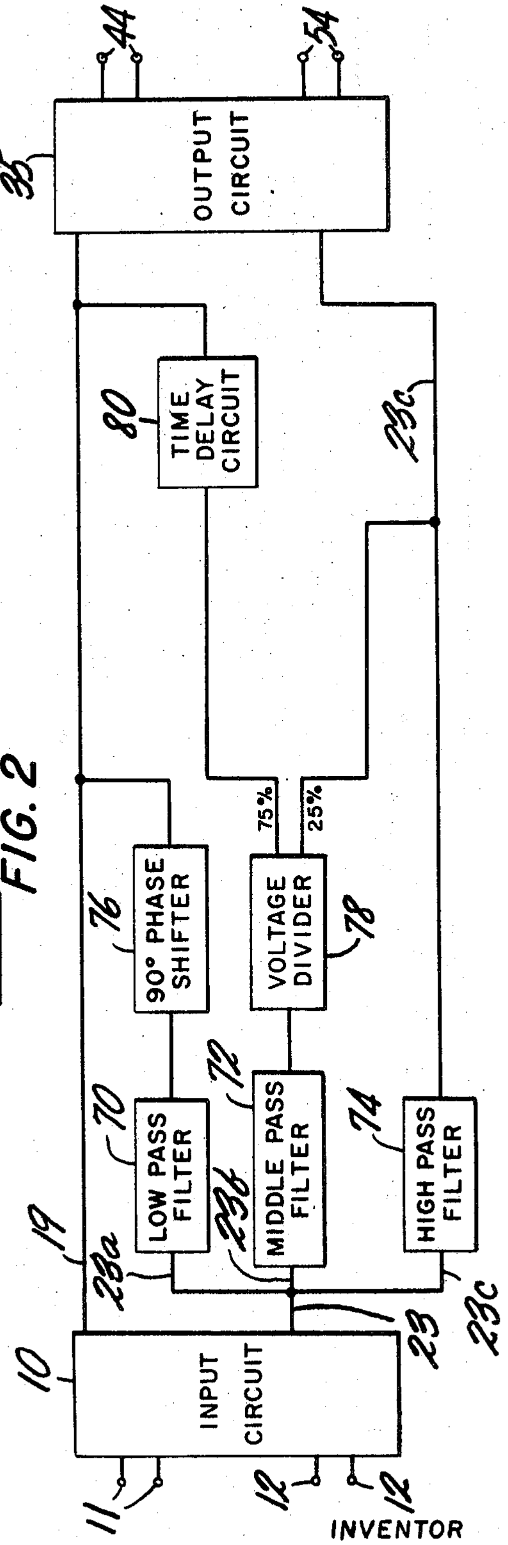
FIG. 2 is a schematic block diagram illustrating another embodiment of the present invention.

In the form of the invention shown in FIG. 2, the input circuit 10 is adapted to receive stereophonic signals and to provide a sum signal which is used to modulate the groove of a record disc in the lateral direction and a difference signal which is used to modulate the groove in a vertical direction. The sum signal is supplied through a channel 19 directly to the output circuit 35.

In the vertical information channel 23, the difference signal is applied to a trio of parallel connected variable band-pass filters 70, 72 and 74 located in subchannels **23*a*, 23*b*, 23*c*, respectively. The filters 70, 72 and 74 divide the difference signal into its low frequency, middle frequency and high frequency components, respectively. Typically, the components of the filters are selected such that the filter 70 passes the frequencies below 250 Hertz, the filter 72 passes the frequencies between say, 250 and 2,500 Hertz, and the filter 74** transmits the frequencies between 2,500 and 15,000 Hertz.

The low frequency components of the difference signal, which, as mentioned above, is the predominant cause of excessive modulation in the vertical direction. is applied from the filter 70 to a 90° phase shifter 76. The phase shifter circuit 76, which may be of a conventional type, produces an output difference signal which lags the input difference signal by 90° and, accordingly, lags the sum signal in the channel 19 by 90°. This phase shifted low frequency component of the difference signal is thereupon shifted from the vertical mode of modulation to the lateral mode of modulation by addition to the sum signal in the lateral information channel 19.

The middle frequency components of the difference signal, which occasionally cause excessive vertical modulation of the record groove, are supplied to a conventional voltage divider 78 which supplies a major part, say 75 percent, of the middle frequency components through a time delay circuit 80 to the lateral information channel 19 and a minor part, say 25 percent to the subchannel **23*c*, respectively. Typically, the amount of delay introduced in the channel 23*b* by the circuit 80 approximates 20 milliseconds. By delaying the middle frequency difference signal in the subchannel 23*b***, substantial cancellation of the signal is avoided when added to the sum signal.

The high frequency components of the difference signal are, as mentioned above, combined with a small portion of the middle frequency components in the channel **23 *c* and then applied to the output circuit 35. In the channel 19, the larger portion of middle frequency components of the difference signal and the phase shifted low frequency components of the difference signal are added to the sum signal and then applied to the output circuit 35. Within the output circuit 35**, sum signals are produced which will energize a transducer to drive a cutting stylus in the lateral direction and difference signals are produced which will energize the transducer to drive the stylus in the vertical direction.

It will be apparent that excessive vertical groove modulation is prevented by removing from the vertical signal the low frequency components and a large part of the middle frequency components, and adding them to the lateral signal. In this manner, excessive vertical modulation is avoided without substantial deterioration of the stereophonic effect.

The above described embodiments of the instant invention have been directed to the reproduction of stereophonic records which may be played on either stereophonic or nonstereophonic phonographs. However, this apparatus may also be employed to make a monaural record from a source of stereophonic signals. In FIG. 1, for example, the broken-line connections indicate an alternate output arrangement for this purpose. A monaural record could be made by adding the outputs of the phase shifters 20 and 24 at adding means 90 and using the combined output to drive a monaural cutter 91. The same result might be achieved by setting the crossover frequencies of the filters 26 and 28 to very high values, say 15-—20 KH.

Although the invention has been described herein with reference to specific embodiments, modifications and variations therein will be readily apparent to those skilled in the art. Accordingly, all such variations and modifications are included within the intended scope of the invention as defined in the following claims.

I claim:

1. In apparatus for modifying stereophonically related sound representative signals prior to application to a stereophonic record cutter for diminishing vertical modulation components without alternating the total energy of reproduced sound, the combination of:

first and second input terminals for receiving a pair of stereophonically related signals; and circuit means connected to said first and second input terminals and operative to modify said stereophonically related signals and to convey said modified signals to a as record cutter;

said circuit means including a pair of all-pass filters respectively connected to said first and second input terminals and operative to introduce and maintain a 90° electrical phase difference between said received stereophonically related signals at all frequencies of interest.

2. In apparatus for modifying stereophonically related sound representative signals prior to application to a monophonic record cutter for diminishing vertical modulation components without altering the total energy of reproduced sound, the combination of:

first and second input terminals for receiving a pair of stereophonically related sound representative signals;

circuit means connected to said first and second input terminals and operative to modify said stereophonically related signals;

said circuit means including a pair of all-pass filters respectively connected to said first and second input terminals and operative to introduce and maintain a 90° electrical phase difference between said received stereophonically related signals at all frequencies of interest; and means connected to said filters for summing said modified signals prior to application to a monophonic record cutter.

3. In a system for the handling of sound representative signals to be reproduced for listening, the combination comprising:

1. means for providing signals representative of stereophonically detected sounds;
2. a first channel coupled to the signal providing means for passing selected first signals;
3. a second channel coupled to the signal providing means for passing selected second signals;
4. phase shift means connected with one of said channels for placing in substantial quadrature phase relationship at least a portion of the selected first signals with respect to the selected second signals to prevent subsequent substantial alterations of combined sounds resulting from concurrent signal portions in the first and second channel; and
5. means connected with both channels for receiving the signals in substantial quadrature phase relationship to provide outputs from the channels representative of the sound subsequently to be reproduced and with said selected first signals maintained in said substantial quadrature phase relationship.

4. In a system for the handling of sound representative signals to be reproduced for listening, the combination comprising means for providing signals representative of stereophonically detected sounds, a first channel coupled to the signal providing means for passing selected first signals, a second channel coupled to the signal providing means for passing selected second signals, phase shift means connected with one of said channels for placing in substantial quadrature phase relationship at least a portion of the selected first signals with respect to the selected second signals, and means connected with both channels for receiving signals in substantial quadrature phase relationship to provide a combined output for subsequent reproduction of sound, the phase shift means including means connected with the first channel for separating higher and lower frequencies of the selected first signals and for placing the separated lower frequencies in substantial quadrature phase relationship with the selected second signals, and the means to provide a combined output including means for combining the separated lower frequencies with the selected second signals of said second channel.

5. In a system for the handling of sound representative signals to be reproduced for listening, the combination comprising means for providing signals representative of stereophonically detected sounds, a first channel coupled to the signal providing means for passing selected first signals, a second channel coupled to the signal providing means for passing selected second signals, phase shift means connected with one of said channels for placing in substantial quadrature phase relationship at least a portion of the selected first signals with respect to the selected second signals, and means connected with both channels for receiving signals in substantial quadrature phase relationship to provide a combined output for subsequent reproduction of sound, the means to provide a combined output comprising adding means connected with both channels to add together the selected first and second signals for the production of a monaural output.

6. In apparatus for producing stereophonic signals suitable for recording as angularly displaced forms of modulation in a record groove, the combination of;

1. means adapted to receive a first stereophonic information representing signal for separating said signal into lower and higher frequency components respectively;
2. means for combining the lower frequency components of said first signal with a second stereophonic information representing signal;
3. means for maintaining a phase difference between said lower frequency components of said first signal and at least the lower frequency components of said second stereophonic information representing signal so as to avoid cancellation of said lower frequency components; and
4. first and second output means connected to receive, respectively, the higher frequency components separated out of said first signal, and the lower frequency components of said first signal combined with said second signal.

7. Apparatus as defined in claim 6 in which the first stereophonic information representing signal is the difference between two stereophonic signals and is to be recorded as vertical groove modulation, and the second stereophonic information representing signal is the sum of said two stereophonic signals and is to be recorded as lateral groove modulation.

8. Apparatus as defined in claim 7 in which said separating means comprises high, middle and low pass filters means for separating the first stereophonic information representing signal into high, middle and low frequency components, together with means for producing substantially quadrature phase shift of said low frequency components, means for voltage dividing said middle frequency components into two parts and means for subjecting one of said two parts to a time delay; the combining means combines the phase shifted low frequency components and the time delayed middle frequency components of said first stereophonic information representing signal with said second stereophonic information representing signal; and the first and second output means are connected to receive, respectively, a first output signal comprising said phase shifted low frequency components and time delayed portion of middle frequency components of said second signal and said first signal, and a second output signal comprising an undelayed portion of said middle frequency components, and the high frequency components of the first stereophonic information representing signal.

9. Apparatus as defined in claim 7 in which the phase difference maintaining means includes all-pass filter means interposed in the paths of said first and second stereophonic information representing signals, respectively.

10. Apparatus as defined in claim 9 in which said separating means comprises constant resistance high and low pass filter means for separating the first stereophonic information representing signal into higher and lower frequency components.

11. Apparatus as defined in claim 10 in which the phase difference maintaining means includes means for subjecting said second stereophonic information representing signal to substantially the same phase shift as that produced by said low pass filter means.

12. Apparatus as defined in claim 11 in which the crossover points of said high and low pass filter means are adjustable over a range of value.

13. Apparatus as defined in claim 12 together with recording means connected to said output means for recording the higher frequency components separated out of said first stereophonic information representing signal as vertical modulation of a record groove, and for recording the combination of the lower frequency components of said first stereophonic information representing signal and said second stereophonic information representing signal as lateral modulation of a record groove.

14. Apparatus as defined in claim 13 together with recording means connected to said output means for recording said first output signal as lateral modulation of a record groove, and for recording said second output signal as vertical modulation of a record groove.

PO-1050
(5/69)

UNITED STATES PATENT OFFICE
CERTIFICATE OF CORRECTION

Patent No. 3,564,162 Dated February 16, 1971

Inventor(s) Benjamin B. Bauer

It is certified that error appears in the above-identified patent and that said Letters Patent are hereby corrected as shown below:

Column 2, line 26, "position" should be -- portion
line 41, "12 and 11" should be -- 11 and 12 --; lin
"differences" should be -- difference --; Column 3,
line 3, after "above" insert -- about --; Column 4,
line 6, "direction." should be -- direction, --;
line 74, "as" should be -- stereophonic --.

Signed and sealed this 21st day of March 1972.

(SEAL)
Attest:

EDWARD M.FLETCHER,JR.
Attesting Officer

ROBERT GOTTSCHALK
Commissioner of Patents